US007587137B2

(12) United States Patent
Barbieri

(10) Patent No.: US 7,587,137 B2
(45) Date of Patent: Sep. 8, 2009

(54) SYSTEM AND METHOD FOR SEAMLESS INTEGRATION OF CWDM AND DWDM TECHNOLOGIES ON A FIBER OPTICS INFRASTRUCTURE

(75) Inventor: Allessandro Barbieri, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 468 days.

(21) Appl. No.: 11/382,095

(22) Filed: May 8, 2006

(65) Prior Publication Data

US 2007/0258716 A1 Nov. 8, 2007

(51) Int. Cl.
*H04J 14/02* (2006.01)
(52) U.S. Cl. .......................... 398/82; 398/97
(58) Field of Classification Search ................... 398/87, 398/92
See application file for complete search history.

(56) References Cited

U.S. PATENT DOCUMENTS

| 6,839,481 B2* | 1/2005 | White | 385/24 |
| 2005/0220397 A1* | 10/2005 | Oikawa et al. | 385/24 |
| 2007/0166040 A1* | 7/2007 | Jang et al. | 398/85 |

OTHER PUBLICATIONS

Hinderthür, H. and L. Friedric. "WDM hybrid transmission based on CWDM plus DWDM". Lightwave Europe. Jul. 2003. viewed on Nov. 3, 2008 <http://lw.pennnet.com/display_article/183295/63/ARTCL/none/none/1/WDM-hybrid-transmission-based-on-CWDM-plus-DWDM/>.*
Li, Y. et al. "Performance of an ultra-low loss, ultra compact, free-space packaging platform for CWDM applications". Biophotonics/Optical Interconnects and VLSI Photonics/WBM Microcavities, 2004 Digest of the LEOS Summer Topical Meetings. Jun. 28-30, 2004: 73-74.*
Ramaswami, R. and K.N. Sivarajan. Optical Networks: A Practical Perspective. 2nd ed. San Francisco: Morgan Kaufmann Publishers, 2002.*
Barbieri, Alessandro et al., "About mixing CWDM and DWDM no the same fiber," Cisco Systems, CMO Technical Marketing, 2002, pp. 1-26.
"Cisco WDM Series of CWDM Passive Devices," Cisco Systems Data Sheet, pp. 1-11, http://www.cisco.com/en/US/products/hw/modules/ps5455/products_data_sheet0900aecd8020d01b.html.
"Hybrid DWDM/CWDM Optical Networks," JDS Uniphase Solution Brief, pp. 1-6, http://www.jdsu.com/site/jdsu_public_website/assets/pdf/Brief_CWDM_DWDM.pdf.
Siemens Slide Presentation, Oct. 2004, slide 15.

* cited by examiner

*Primary Examiner*—Leslie Pascal

(57) ABSTRACT

The present invention provides a system and method for multiplexing DWDM channels on top existing CWDM infrastructure. An erbium-doped fiber amplifier amplifies DWDM signals in the DWDM domain to compensate for 10 G optics power budget limitations without blocking the CWDM signals. A passive WDM infrastructure allows the CWDM and DWDM signals to be multiplexed and de-multiplexed on the same fiber and allows seamless integration with existing infrastructure avoiding the need to sacrifice CWDM channels.

24 Claims, 3 Drawing Sheets

SYSTEM AND METHOD FOR SEAMLESS INTEGRATION OF CWDM AND DWDM TECHNOLOGIES ON A FIBER OPTICS INFRASTRUCTURE

BACKGROUND OF THE INVENTION

1. Field of Invention

The present invention relates to optical networking and more specifically, to a system and method for integrating CWDM and DWDM technologies on a common fiber optics infrastructure.

2. Description of Related Art

Coarse wavelength division multiplexing (CWDM) is a method of combining multiple signals on laser beams at various wavelengths for transmission along fiber optic cables. CWDM systems are a popular choice for metro access networks and major telecoms have a significant capital investment in the CWDM infrastructure. Although the number of channels in a CWDM system is fewer than in a dense wavelength division multiplexing (DWDM) system, CWDM remains widely deployed in metro access networks where the distance is limited to about 80 kilometers (km). As used herein, CWDM refers to an ITU (International Telecommunications Union) standard which includes the specification of the particular channel wavelengths and the spacing between these channels. DWDM refers to an ITU standard in which the channel spacing is tighter so more wavelength channels are packed into an optical fiber.

With the continued growth in network traffic, telecoms are motivated to upgrade the capacity of their network to meet customer expectations. This means that telecoms need to increase channel density by adding additional wavelengths. However, CWDM is effectively limited to about eight different wavelengths on common ITU-T G.652 fiber (type A and B). The G.652a and G.652b specifications define the optical fiber specifications. These optical fibers are typically found in extended length LAN, MAN and access network systems. Clearly, rather than ripping out the CWDM network and replacing it with a DWDM network, telecoms need a cost effective solution that can increase channel density by adding wavelengths in a seamless, non-evasive manner to the CWDM network.

On approach that has been suggested is to cannibalize a portion of the CWDM wavelengths to route DWDM channels. Because, DWDM has tighter channel spacing, replacing 25% to 50% of the CWDM channels with DWDM channels results in an overall increase in channel density. Unfortunately, this approach has several shortcomings. For example, the telecom loses a significant portion of their CWDM bandwidth, which is clearly undesirable. Further, because of the optical characteristics of the 1 GbE and 10 GbE, performance is degraded and the network is limited to much less than 80 kilometers (km). Thus, the telecom would have to redesign the entire network to take into account the degraded performance. Further still, the DWDM channels undergo significantly more attenuation than the CWDM channels which is a critical limitation for 10 G application already suffering a power budget gap with ½ GbE CWDM channels.

Notwithstanding the problems with adding addition channels, telecoms are also motivated to upgrade the data rates of their network to meet customer expectations. This means that telecoms need to increase data rates on at least part of the channel capacity. Since most of the installed CWDM networks already include the technology infrastructure to support 1 Gigabit Ethernet (GbE), the natural progression would be to upgrade the CWDM infrastructure to handle 10 GbE. However, because DWDM technology dominates the 10 GbE market, there is only limited market opportunity for 10 GbE CWDM technology and the acquisition price for that technology too high. Thus, telecoms are being forced to upgrade their infrastructure to 10 GbE DWDM.

The upgrade to 10 GbE DWDM means that telecoms either have to string new fiber or mix DWDM with CWDM optical technologies on the same fiber. Unfortunately, because the 10 G optics has a reduced power budget compared to the lower speed GbE optics, it is not possible to simply insert 10 G optics on existing CWDM installations because any optical amplification of the DWDM would block the CWDM wavelengths that are outside the pass band of the amplifiers.

Accordingly, most telecoms resort to leaving the traditional CWDM network intact and stringing a separate fiber to handle the DWDM network traffic. Not only is this an expensive alternative, laying new fiber is intrusive and potentially disruptive to the existing network as new power supplies and other infrastructure is swapped out to handle the new network.

What is needed is a system and method that increases the channel density of CWDM networks and migrates the CWDM networks to 10 GbE in a seamless and non-invasive manner.

DETAILED DESCRIPTION OF THE INVENTION

Figure 1:
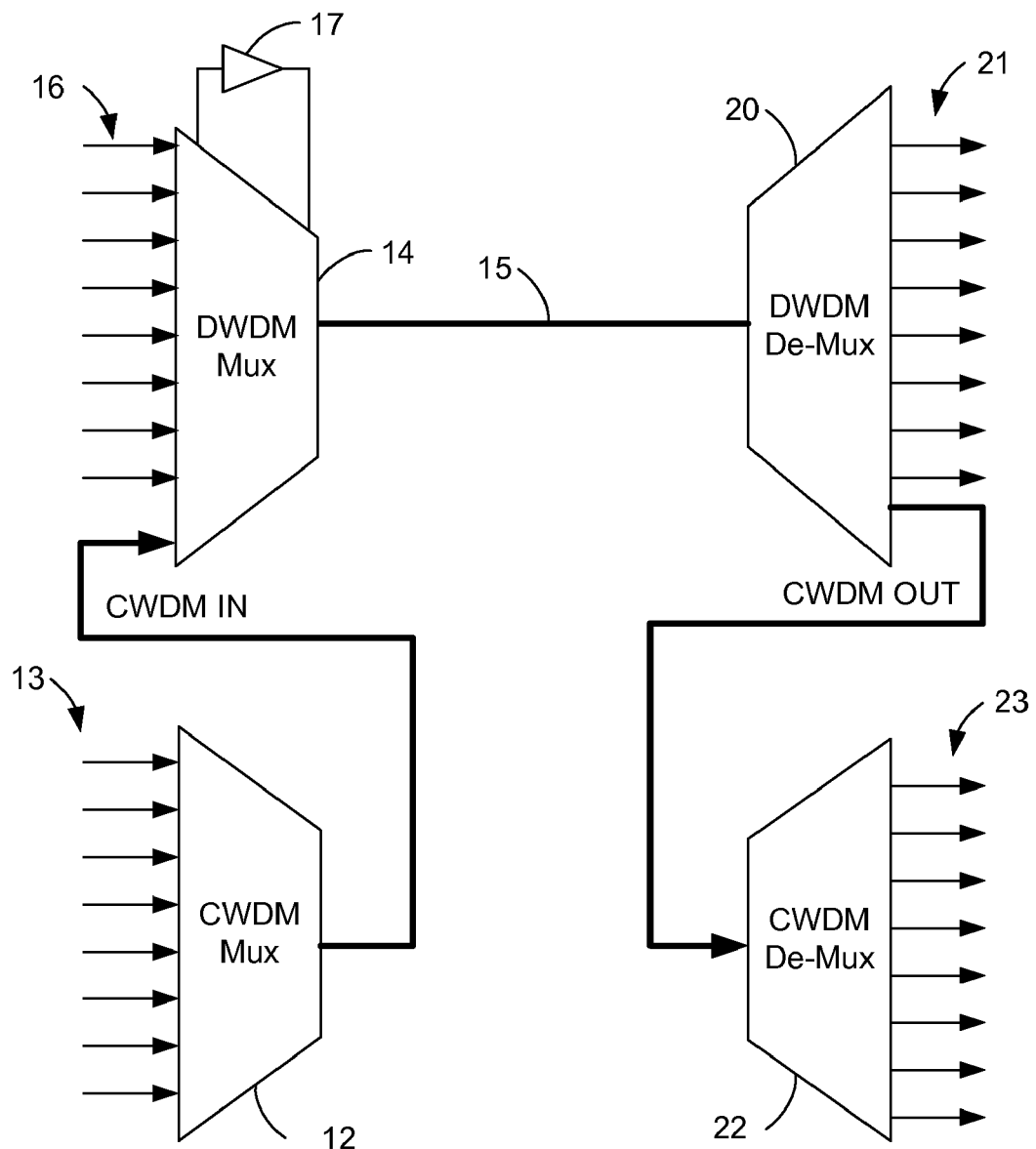
FIG. 1 illustrates an exemplary and simplified CWDM optical network 10 that includes both CWDM and DWDM channels in accordance with an embodiment of the present invention.

The present invention relates to optical networking and more specifically, to a system and method for integrating CWDM and DWDM technologies on a common fiber optics infrastructure that provides an increases channel density and migrates current lower speed GbE/OC-48 CWDM infrastructure to 10 GbE in a seamless and non-invasive manner.

In the following description of embodiments of the present invention, reference is made to the accompanying drawings that form a part hereof, and in which is shown by way of illustration specific embodiments in which the invention may be practiced. It is to be understood that other embodiments may be utilized and that changes may be made without departing from the scope of the present invention.

Further, in the following description of embodiments of the present invention, numerous specific details are presented to provide a complete understanding of the embodiments of the invention. One skilled in the relevant art will recognize, however, that the invention may be practiced without one or more of the specific details, or with other methods, components, etc. In other instances, well-known structures or operations are not shown or described in detail to avoid obscuring aspects of various embodiments of the invention. Wherever possible, the same reference numbers will be used throughout in the drawings to refer to the same or like components.

Refer now to FIG. 1, which illustrates an exemplary and simplified CWDM optical network 10 that includes both CWDM and DWDM channels. More specifically, optical network 10 includes an optical multiplexer 12 receiving a plurality of CWDM channels, generally indicated at 13. In the illustrated embodiment, the channels have wavelengths spaced 20 nanometers (nm) apart at eight defined wavelengths: 1611 nm, 1591 nm, 1571 nm, 1551 nm, 1531 nm, 1511 nm, 1491 nm, and 1471 nm. As is well understood, the energy from the lasers in a CWDM system is spread out over a larger range of wavelengths than is the energy from the lasers in a DWDM system. The tolerance or extent of wavelength imprecision or variability in a CWDM laser is much looser compared to the tighter tolerance required of a DWDM laser. Because of the use of lasers with lower precision, a CWDM system is less expensive and consumes less power than a DWDM system.

The output of multiplexer 12 is routed to a DWDM multiplexer 14 where the CWDM signal is multiplexed onto fiber 15 with a plurality of DWDM signals, generally indicated at 16. Advantageously, none of the CWDM channels are sacrificed to provide the plurality of DWDM channels.

Before the DWDM signals are multiplexed with the CWDM signals, they are amplified in the DWDM domain by erbium doped amplifiers 17 to compensate for the reduced power budget of 10 G optics.

The combined CWDM and DWDM signals are demultiplexed by DWDM demultiplexer 20 that separates the DWDM from the CWDM signals. The DWDM signals are provided as outputs as generally indicated at 21. The CWDM signal is routed to a second demultiplexer, CWDM demultiplexer 22 that provides the plurality of CWDM signals, as generally indicated at 23.

Figure 2:
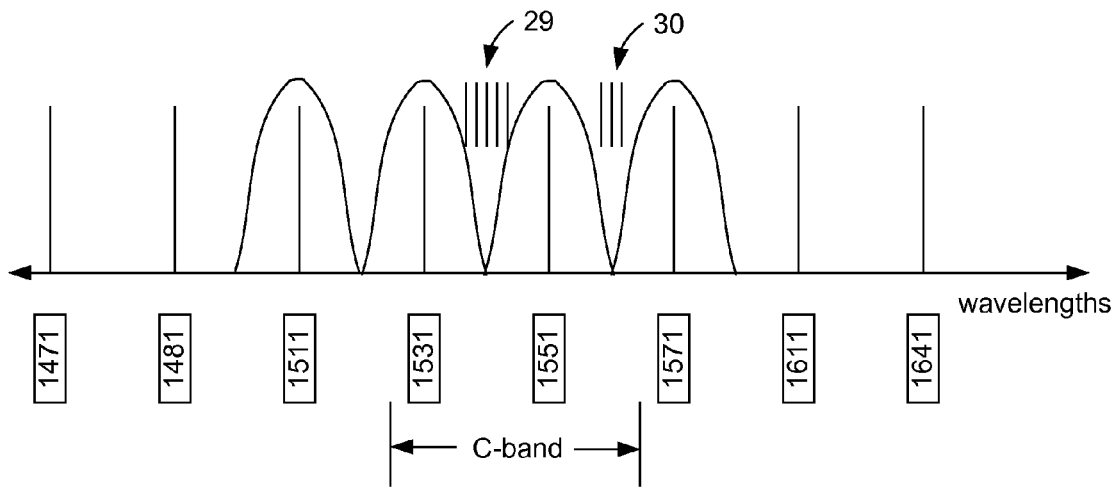
FIG. 2 illustrates the typical channel spacing in a CWDM system together with the DWDM channel overlay in accordance with an embodiment of the present invention.

FIG. 2 illustrates the typical channel spacing in a CWDM system together with the DWDM channel overlay. As is well understood in the art, common CWDM filter design calls for eight channels aligned on the ITU-T G.694.1 grid (1471, 1491, 1511, 1531, 1551, 1571, 1591, 1611 nm). One skilled in the art will understand that other channel alignments are feasible (for example, the grid may begin at 1470 with a channel spacing of 20 nm. Further, there may be more than eight CWDM channels depending on the specific implementation of a network.

Each CWDM filter bandwidth is about 12 nm wide. This means that the 1551 nm filter channel extends as high as 1557 nm, as indicated at 25. The 1571 nm filter channel extends as low as 1565 nm, as indicated at 26. Similarly, the 1531 channels extends up to 1537 nm, as indicated at 27, while the 1551 channels extends down to 1545 nm, as indicated at 28.

The CWDM filter design leaves two spectral regions, in between CWDM channels, that overlap with the C-band where DWDM wavelengths reside. The C-band, or conventional band, refers to the spectral window from about 1525 nm to 1565 nm. This window also corresponds to the amplifying range of erbium-doped fiber amplifiers 17. With the ITU-T G.692 DWDM grid and appropriate CWDM passive filters, eight additional DWDM channels are inserted in between existing CWDM channels. In one embodiment, additional band filters are used to provide about 30 dB isolation between CWDM and DWDM channels.

The eight additional DWDM channels are divided into two groups. One group in the 1538.98 to 1542.94 spectral window is inserted between the 1531 and 1551 CWDM channels as indicated at 29. The second group in the 1548.98 to 1560.61 spectral window are inserted between the 1551 and the 1570 CWDM channels as indicated at 30.

Figure 3:
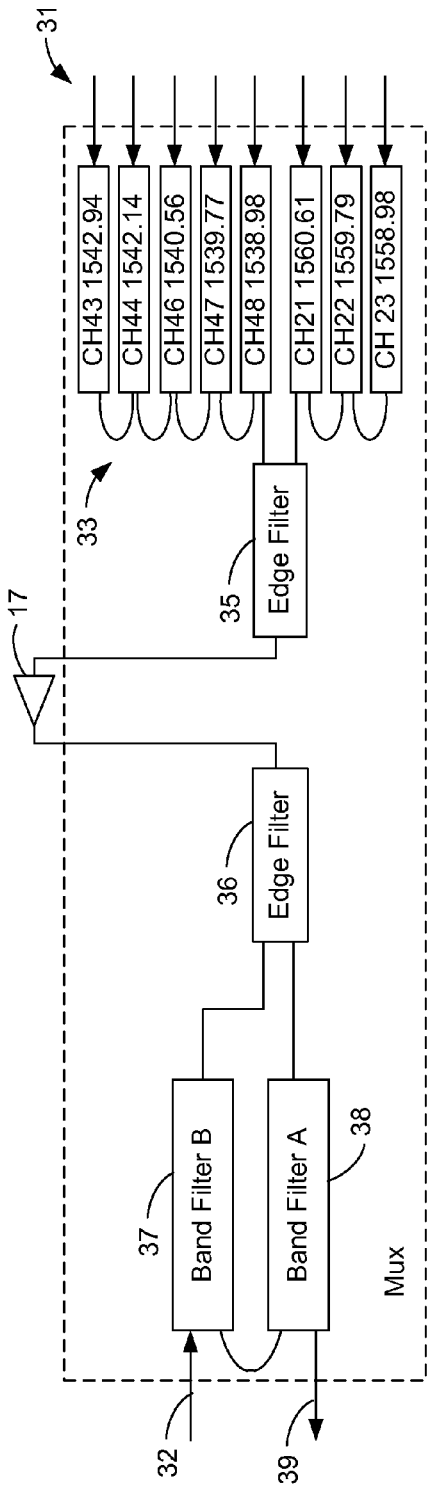
FIG. 3 illustrates a DWDM multiplexer for multiplexing DWDM channels onto the CWDM network in accordance with an embodiment of the present invention.

FIG. 3 illustrates DWDM multiplexer 14 in greater detail. Specifically, DWDM 14 comprises a plurality of DWDM inputs, indicated generally at 31. In one embodiment, two groups of DWDM channels are defined, one group having three wavelength and one group having five wavelengths for a total number of eight DWDM channels in addition to eight CWDM channels received from CWDM multiplexer 12. The multiplexed CWDM channels are received on input 32.

Each of the two groups of DWDM signals are passed through an appropriate channel filter, indicated generally at 33, and combined. The combined channels from each group are then routed to an edge filter 35 to ensure adequate isolation from the CWDM signals.

The output of edge filter 35 is routed to erbium doped amplifiers 17 to compensate for the reduced power budget of 10 G optics. The present invention deploys amplification on the 10 G DWDM channels alone because these channels are the ones short of power budget. The challenge is to deploy optical amplification in a manner that does not affect the CWDM channels because most optical amplifiers will cut-off any wavelength outside their amplification range (C-band for common metro devices). Because it is not possible to pass CWDM wavelengths through DWDM amplifiers, it is not possible to place an amplifier on the fiber where both CWDM and DWDM channels co-exist. The addition of amplifiers 17 advantageously amplifies the DWDM channels before combination with the CWDM signals.

To illustrate, consider that a typical CWDM 1 GbE packaged in a Small Form factor Pluggable (SFP) that has a 29 dB power budget over 80 km and assume that the dispersion penalty is negligible. The maximum fiber loss will be 29 dB−4.4 dB (which is the worst case loss through the multiplexer 12 and demultiplexer 22)−2.2 dB (DWDM filter pass-through in DWDM multiplexer 14)=22.4 dB 10GE DWDM Xenpak has 20 dB of power budget over 80 km with approximately 3 dB of dispersion penalty. The maximum fiber loss is thus 20 dB−4.7 dB (DWDM multiplexer 14 and demultiplexer 20)=15.3 dB. Thus, there is a 7.1 dB difference in fiber budget which means approximately 25 to 30 km less distance for the 10 GE channels.

Amplifier 17 may be a mini-erbium-doped fiber amplifier (EDFA), which is a very low cost optical device with several meters of glass fiber doped with erbium ions that boosts an optical signal when the erbium ions are excited to a high energy state or an erbium-doped waveguide amplifier (EDWA) which is an optical amplifier similar to an EDFA, but which derives a higher gain through a small waveguide rather than several meters of fiber. Amplifier is put on the MUX path to bump up the power of the eight 10 GbE DWDM channels by about +7 dB.

The enclosure housing multiplexer 14 includes two additional customer accessible ports to couple the DWDM signals to optical amplifier 17. Amplifier 17 amplifies the DWDM channels before they get multiplexed with the CWDM signals on the fiber trunk.

In this manner, amplifier 17 provides enough power to the eight DWDM 10 GbE channels overlaying the CWDM cloud to transport the DWDM 10 GbE channels at least 80 km. This eliminates the need to develop special 10 G CWDM lasers. Further, there is no need to sacrifice any of the existing CWDM channels when the DWDM 10 GbE channels are added to the same fiber infrastructure.

The output of amplifier 17 is routed to a second edge filter 36 to re-shape the DWDM signals. Filter 36 feeds one of the two groups, for example channels 21-23, to a band filter 37 where the DWDM are multiplexed onto the CWDM signal (from input 32) as it is reflected by filter 37. The combined signal is then reflected at band filter 38 where the second of the two groups of DWDM channels are multiplexed onto the combined signal. The output of filter 38 is sent out of output port 39 to the receiver along fiber 15.

Figure 4:
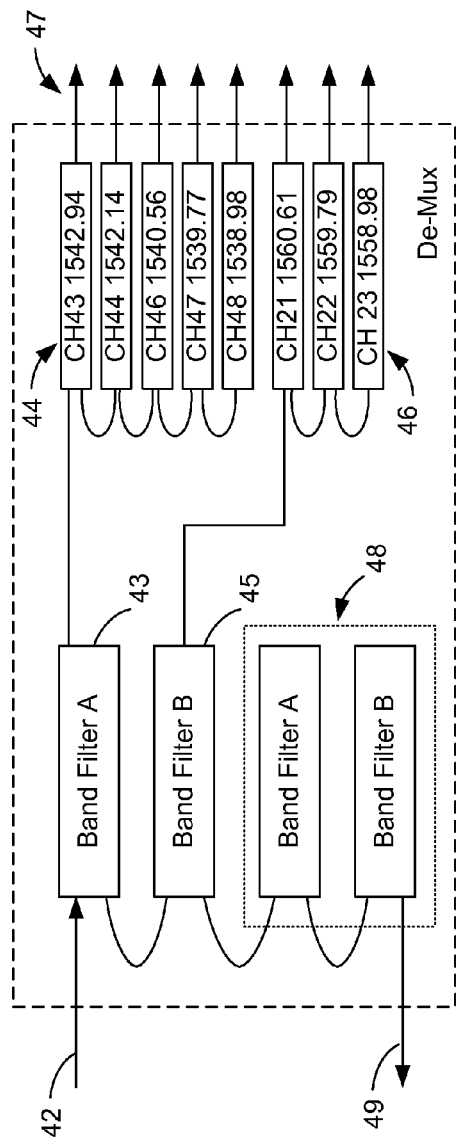
FIG. 4 illustrates the receiver portion of demultiplexer for recovering DWDM channels from the CWDM network in accordance with an embodiment of the present invention.

FIG. 4 illustrates the receiver portion of demultiplexer 20. More specifically, the combined CWDM and DWDM signal is received from fiber 15 at input port 42. The combined signal is reflected at a first band filter 43 where the second of the two DWDM groups are demultiplexed from the combined signal. The demultiplexed signal is reflected through a series of band pass filters, indicated generally at 44, to recover each of the five channels CH43 (1542.94), CH44 (1542.14), CH46 (1540.56), CH47 (1539.77) and CH48 (1538.98).

The second group of DWDM signals are then reflected at a second band pass filter 45 where channels CH21 (1560.61), CH22 (1559.79) and CH23 (1558.98) are filtered from the combined signal. Channels 21-23 are then separated by band pass filters, indicated generally at 46. The DWDM channels are provided as outputs at output ports 47. The CWDM signal is then routed through two additional band filters, indicated generally at 48, to further improve isolation and then from output port 49 to the CWDM de-multiplexer 22 (see FIG. 1) where CWDM signals 1471-1611 are recovered.

In one embodiment of the present invention, a separate DWDM multiplexer and amplifier are provided on the transmit side of network 15 and a separate DWDM de-multiplexer is provided on the receive side of network 15. In another embodiment, each side of network 15 comprises a module that includes the DWDM multiplexer, amplifier, and DWDM de-multiplexer in a single enclosure.

Advantageously, the present invention increases channel capacity in a CWDM networks without sacrificing existing wavelengths. From the telecom's perspective, the present invention does not require any network re-engineering because the module is simply cascaded with an existing CWDM filter.

Figure 5:
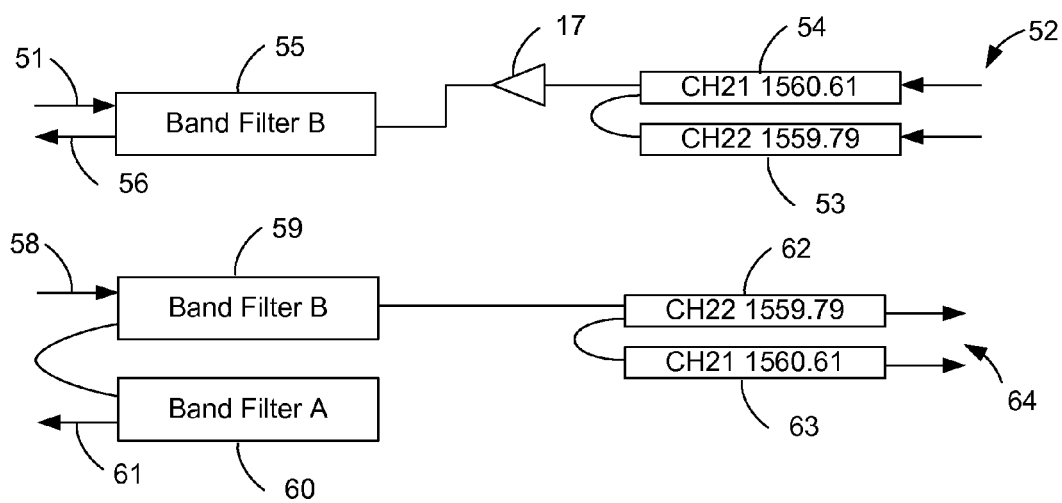
FIG. 5 illustrates a transceiver having a DWDM multiplexer and a DWDM demultiplexer in accordance with an embodiment of the present invention.

FIG. 5 illustrates an alternative embodiment for a module 50 that implements two additional DWDM 10 GbE channels in a CWDM network. This low cost embodiment, includes input port 51 for receiving the CWDM signals and input ports 52 for receiving DWDM channels. The DWDM channels are combined by filtering channel 22 with pass band filter 53 and then reflecting channel 22 at pass band filter 54 where it is combined with channel 21. Amplifier 17 then amplifies the DWDM channels before routing the signals to band pass filter 55. The DWDM channels are combined with the CWDM channel when it is reflected by filter 55. The combined DWDM and CWDM signals are then routed to the network 15 through port 56. Advantageously, there is no requirement for edge filters due to the low density of DWDM channels.

On the receive side, the combined DWDM and CWDM signal is received on port 58 with the CWDM signal reflected by band filter 59 where the DWDM signals are removed. The CWDM signal is then reflected by band filter 60 to improve isolation before being routed to the CWDM de-multiplexer 22 (see FIG. 1) by way of output port 61. The individual DWDM signals, channel 22 and channel 21, are recovered by filter 62 and 63, respectively. Channels 22 and 21 are then available at output ports 64.

In other embodiments, a transceiver 50 that implements four additional DWDM 10 GbE channels in a CWDM network. In yet another embodiment, a transceiver 50 that implements six additional DWDM 10 GbE channels in a CWDM network. In yet another embodiment, a plurality of additional DWDM 10 GbE channels are provided in the CWDM network.

The present invention solves the problem of growing existing CWDM networks to 10 GbE using DWDM 10G optics. By amplifying the DWDM signals in the DWDM domain, the present invention addresses the reduced power budget of 10 G optics in a fashion that is totally transparent to the CWDM network.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. An optical network comprising:
    a course wavelength division multiplexing (CWDM) multiplexer having a plurality of CWDM signal inputs configured to receive a plurality of CWDM signals and a signal output, wherein the CWDM multiplexer is configured to multiplex the plurality of CWDM signals into a multiplexed CWDM signal supplied to the signal output;
    an amplifier configured to receive a plurality of dense wavelength division multiplexing (DWDM) signals, wherein wavelengths of the plurality of DWDM signals are between adjacent CWDM channels of the plurality of CWDM signals that are currently being used for transmission, wherein the amplifier is configured to amplify the plurality of DWDM signals and output amplified DWDM signals; and
    a DWDM multiplexer having a plurality of DWDM signal inputs configured to receive the amplified DWDM signals, an a CWDM input coupled to the signal output of the CWDM multiplexer, and CWDM output, wherein the DWDM multiplexer is configured to multiplex the amplified DWDM signals with the multiplexed CWDM signal to produce a CWDM/DWDM multiplexed signal supplied to CWDM output.

2. The optical network of claim 1, and further comprising a first filter coupled between the plurality of DWDM signal inputs and the amplifier, wherein the first filter is configured to isolate the plurality of DWDM signal inputs from signals received on the CWDM input.

3. The optical network of claim 2, and further comprising a second filter coupled to an output of the amplifier and which second filter is configured to shape the plurality of DWDM signals.

4. The optical network of claim 3, and further comprising a plurality of channel filters, each assigned to a particular channel, which receive the plurality of DWDM signals and output groups of DWDM signals corresponding to respective ones of a plurality of channels.

5. The optical network of claim 4, and further comprising a plurality of band filters, wherein the second filter is configured to supply a first group of DWDM signals corresponding to a first channel to a first band filter and a second group of DWDM signals corresponding to a second channel to a second band filter, wherein the first band filter is configured to multiplex the first group of plurality of DWDM signals to produce a combined signal that is reflected to the second band filter, and wherein the second band filter is configured to multiplex the first and second groups of DWDM signals onto the combined signal to produce as output the CWDM/DWDM multiplexed signal.

6. The optical network of claim 1, wherein the amplifier is configured to amplify the plurality of DWDM signals with sufficient power to transport the plurality of DWDM signals at least 80 kilometers (km).

7. The optical network of claim 1, wherein the plurality of DWDM signals are interspersed between adjacent CWDM channels.

8. The optical network of claim 1, wherein a first group of the plurality of DWDM signals is interspersed between the 1531 and the 1551 CWDM channels.

9. The optical network of claim 8, wherein a second group of the plurality of DWDM signals is interspersed between the 1551 and the 1571 CWDM channels.

10. The optical network of claim 1, wherein the plurality of DWDM signals is interspersed between the 1531 and 1571 the CWDM channels.

11. The optical network of claim 1, wherein the amplifier comprises at least one of a mini-erbium-doped fiber amplifier and an erbium-doped waveguide amplifier.

12. The optical network of claim 1, wherein the plurality of DWDM signals comprise 10 gigabit Ethernet signals.

13. The optical network of claim 1, and further comprising:
a DWDM de-multiplexer having an input coupled to an optical fiber to which the CWDM/DWDM multiplexed signal is supplied by the DWDM multiplier, wherein the DWDM de-multiplexer is configured to recover the plurality of DWDM signals from the CWDM/DWDM multiplexed signal and the multiplexed CWDM signal.

14. The optical network of claim 13, further comprising a CWDM de-multiplexer having an input coupled to the DWDM de-multiplexer and configured to recover the plurality of CWDM signals from the multiplexed CWDM signal.

15. A method comprising:
receiving a plurality of dense wavelength division multiplexing (DWDM) signals;
receiving a multiplexed course wavelength division multiplexing (CWDM) signal derived from a plurality of CWDM signals, wherein wavelengths of the DWDM signals are between adjacent CWDM channels that are currently being used for transmission;
first filtering the plurality of DWDM signals with a first filter in order to isolate the plurality of DWDM signals from the multiplexed CWDM signal;
amplifying the plurality of DWDM signals to produce amplified DWDM signals;
second filtering the plurality of DWDM signals with a second filter in order to shape the plurality of DWDM signals; and
multiplexing the amplified DWDM signals with the multiplexed CWDM signal to produce a CWDM/DWDM multiplexed signal for transmission over a CWDM network infrastructure.

16. The method of claim 15, wherein the CWDM signals comprise at least one of 1 and 2 Gigabyte Ethernet (GbE) signals and the DWDM signals comprise 10 GbE signals.

17. The method of claim 15, wherein first filtering and second filtering are performed with edge filters.

18. The method of claim 17, wherein multiplexing further comprises:
reflecting the multiplexed CWDM signal at a first band filter to combine the multiplexed CWDM signal with a first group of the plurality of DWDM signals corresponding to a first channel of DWDM signals; and
reflecting the multiplexed CWDM signal at a second band filter to combine the multiplexed CWDM signal and the first group of the plurality of DWDM signals with a second group of the plurality of DWDM signals corresponding to a second channel of DWDM signals, to thereby produce the CWDM/DWDM multiplexed signal.

19. The method of claim 18, wherein the CWDM/DWDM multiplexed signal comprises at least eight CWDM channels and up to eight DWDM channels.

20. The method of claim 18, and further comprising:
de-multiplexing the CWDM/DWDM multiplexed signal to obtain the plurality of DWDM signals and the multiplexed CWDM signal;
de-multiplexing the plurality of DWDM signals to recover the first group and second group of DWDM signals; and
de-multiplexing the multiplexed CWDM signal to recover the plurality of CWDM signals.

21. The method of claim 20, further comprising filtering the plurality of DWDM signals to provide at least 30 dB isolation between CWDM and DWDM channels.

22. The method of claim 20, wherein the first group comprises up to five DWDM channels that are interspersed between two adjacent CWDM channels in the C-band.

23. The method of claim 20, wherein the second group comprises up to three DWDM channels that are interspersed between two CWDM channels in the C-band.

24. The method of claim 15, wherein amplifying comprises amplifying the DWDM signals to provide enough power to transmit the DWDM signals at least 80 kilometers(km).

* * * * *

UNITED STATES PATENT AND TRADEMARK OFFICE
CERTIFICATE OF CORRECTION

PATENT NO. : 7,587,137 B2  
APPLICATION NO. : 11/382095  
DATED : September 8, 2009  
INVENTOR(S) : Alessandro Barbieri Page 1 of 1

It is certified that error appears in the above-identified patent and that said Letters Patent is hereby corrected as shown below:

On the Title page of the patent, in the Inventor section (75), replace "Allessandro" with -- Alessandro --.

Signed and Sealed this

Twenty-fourth Day of November, 2009

David J. Kappos  
*Director of the United States Patent and Trademark Office*